(12) United States Patent
Kim et al.

(10) Patent No.: US 11,114,708 B2
(45) Date of Patent: Sep. 7, 2021

(54) BATTERY PACK TEMPERATURE CONTROL METHOD AND DEVICE

(71) Applicant: LG CHEM, LTD., Seoul (KR)

(72) Inventors: Seung Hwan Kim, Cheongju-si (KR); Dong Hyun Kim, Sejong (KR)

(73) Assignee: LG CHEM, LTD., Seoul (KR)

( * ) Notice: Subject to any disclaimer, the term of this patent is extended or adjusted under 35 U.S.C. 154(b) by 110 days.

(21) Appl. No.: 16/478,312

(22) PCT Filed: Feb. 21, 2018

(86) PCT No.: PCT/KR2018/002133
§ 371 (c)(1),
(2) Date: Jul. 16, 2019

(87) PCT Pub. No.: WO2018/230812
PCT Pub. Date: Dec. 20, 2018

(65) Prior Publication Data
US 2019/0386352 A1  Dec. 19, 2019

(30) Foreign Application Priority Data

Jun. 13, 2017 (KR) .................. 10-2017-0074084

(51) Int. Cl.
*H01M 10/48* (2006.01)
*H01M 10/615* (2014.01)
*H01M 10/63* (2014.01)
*H01M 50/20* (2021.01)

(52) U.S. Cl.
CPC ......... *H01M 10/48* (2013.01); *H01M 10/615* (2015.04); *H01M 10/63* (2015.04); *H01M 50/20* (2021.01)

(58) Field of Classification Search
CPC .... H01M 10/48; H01M 10/615; H01M 10/63; H01M 2/1016
See application file for complete search history.

(56) References Cited

U.S. PATENT DOCUMENTS

| | | | |
|---|---|---|---|
| 2010/0096922 | A1 | 4/2010 | Kishimoto |
| 2010/0100266 | A1 | 4/2010 | Yoshinori et al. |
| 2012/0040224 | A1 | 2/2012 | Reischmann et al. |

(Continued)

FOREIGN PATENT DOCUMENTS

| | | |
|---|---|---|
| CN | 201985213 U | 9/2011 |
| CN | 102447144 A | 5/2012 |

(Continued)

OTHER PUBLICATIONS

European Search Report for Application No. 18816905.6 dated Jan. 7, 2020.

(Continued)

*Primary Examiner* — Olatunji A Godo
(74) *Attorney, Agent, or Firm* — Birch, Stewart, Kolasch & Birch, LLP

(57) ABSTRACT

A method and apparatus for controlling a temperature of a battery pack, in which, when the battery pack is in an extremely low temperature state during charging/discharging, a PWM signal having a duty ratio value that increases as the temperature increases is outputted to intermittently drive a heat generating unit so that the battery pack stably increases in temperature.

10 Claims, 4 Drawing Sheets

(56) References Cited

U.S. PATENT DOCUMENTS

| | | | |
|---|---|---|---|
| 2012/0092018 A1* | 4/2012 | Scheucher | H01M 10/6571 |
| | | | 324/426 |
| 2012/0156530 A1* | 6/2012 | Kang | H01M 10/63 |
| | | | 429/50 |
| 2012/0217933 A1 | 8/2012 | Abe et al. | |
| 2013/0189597 A1 | 7/2013 | Kim et al. | |
| 2015/0108114 A1 | 4/2015 | Beuning et al. | |

FOREIGN PATENT DOCUMENTS

| JP | 2010-119282 A | 5/2010 |
|---|---|---|
| JP | 2013-048063 A | 3/2013 |
| KR | 10-2010-0044693 A | 4/2010 |
| KR | 10-2012-0067520 A | 6/2012 |
| KR | 10-2012-0125002 A | 11/2012 |
| KR | 10-2013-0085325 A | 7/2013 |
| KR | 10-1297005 B1 | 8/2013 |
| KR | 10-2014-0045624 A | 4/2014 |
| KR | 10-2016-0112073 A | 9/2016 |
| KR | 10-1666199 B1 | 10/2016 |

OTHER PUBLICATIONS

International Search Report for PCT/KR2018/002133 (PCT/ISA/210) dated Jun. 1, 2018, with English translation.

* cited by examiner

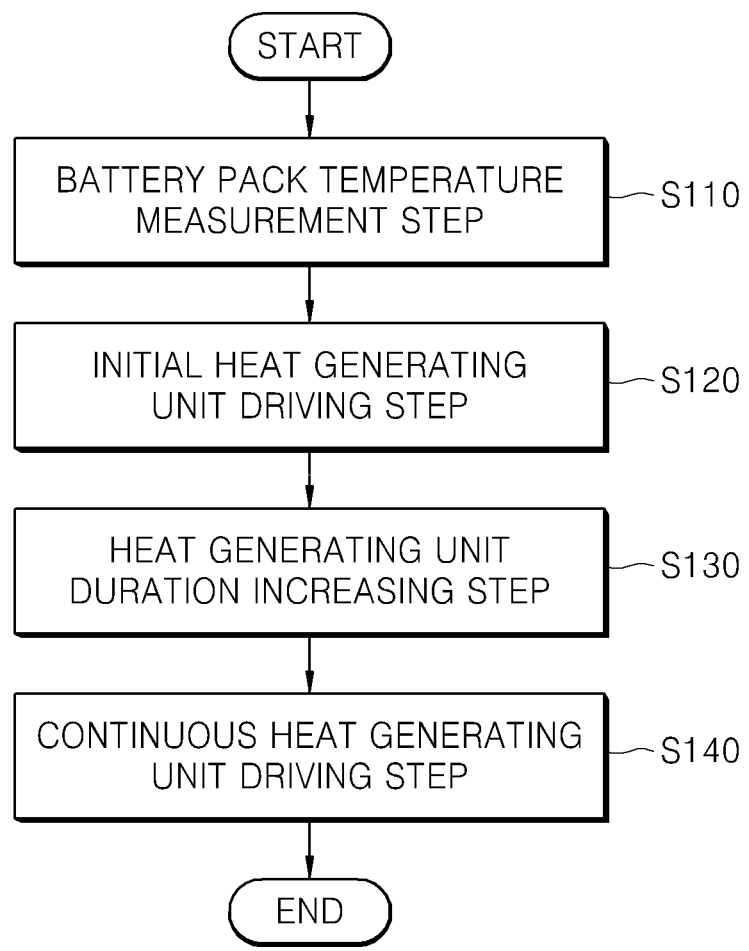
[Fig. 1]

[Fig. 2]
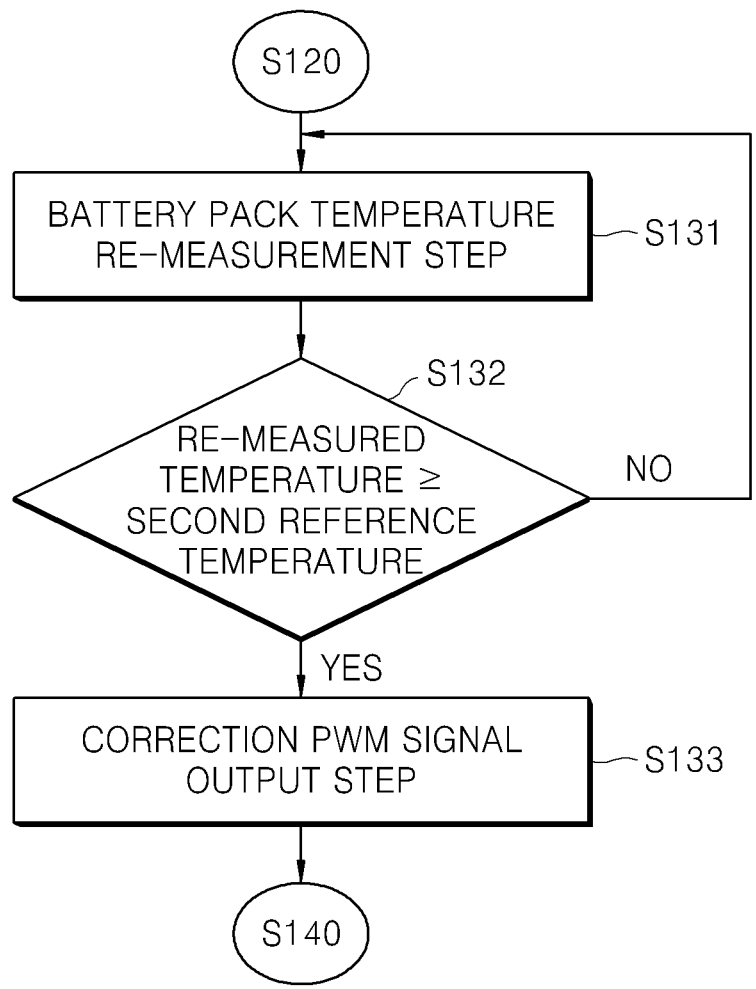

[Fig. 3]
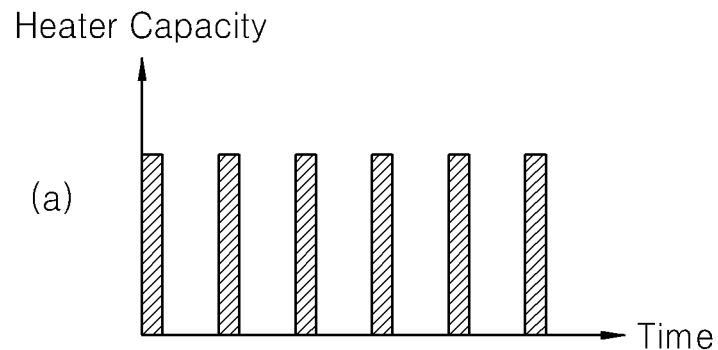
(a)
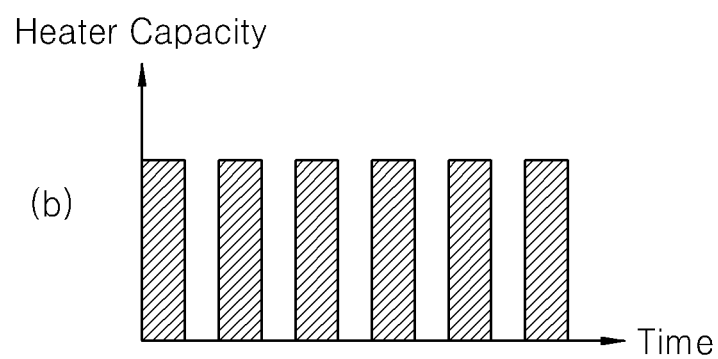
(b)
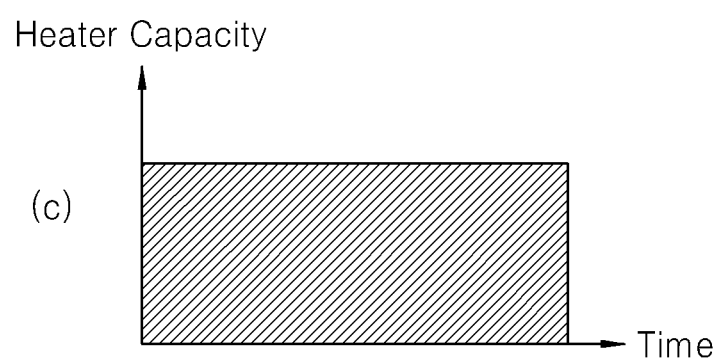
(c)

[Fig. 4]
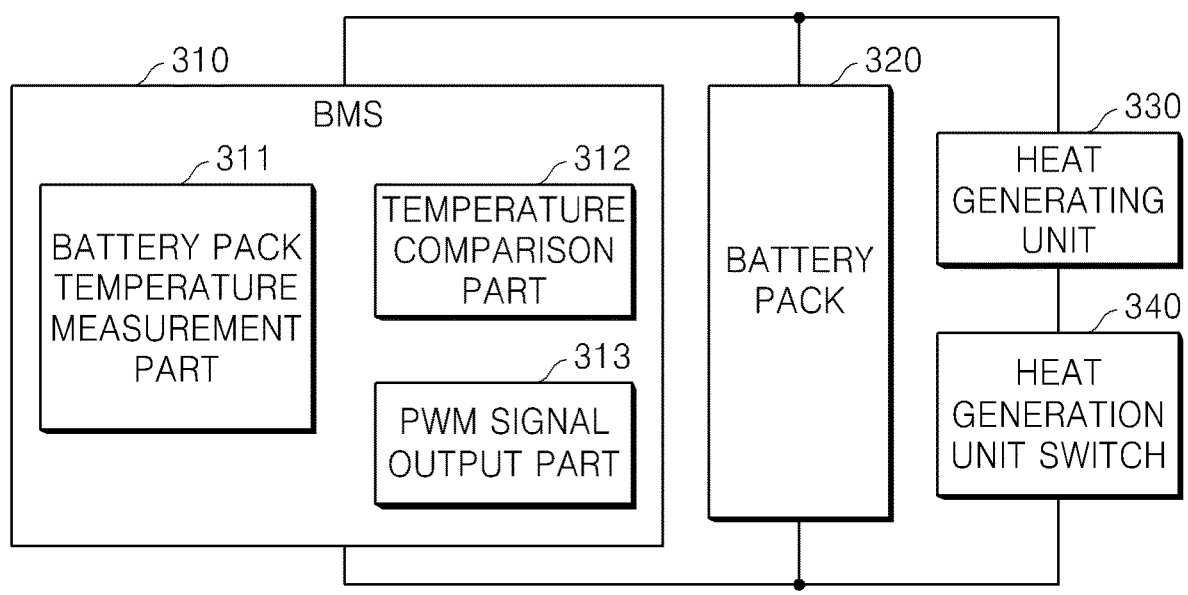

BATTERY PACK TEMPERATURE CONTROL METHOD AND DEVICE

TECHNICAL FIELD

The present invention relates to a method and apparatus for controlling a temperature of a battery pack, and more particularly, to a method and apparatus for controlling a temperature of a battery pack, in which, when the battery pack is in an extremely low temperature state during charging/discharging, a PWM signal having a duty ratio value that increases as the temperature increases is outputted to intermittently drive a heat generating unit so that the battery pack stably increases in temperature.

BACKGROUND ART

A typical battery pack is provided as a chargeable/dischargeable secondary battery. The secondary battery includes a plurality of assemblies, each of which includes a plurality of unit cells.

Also, the cell is constituted by a positive electrode collector, a separator, an active material, an electrolyte, an aluminum thin film layer, and the like. Since the charging/discharging of the battery pack is performed by electrochemical reaction, the battery pack is affected by ambient temperature conditions.

In general, it is recommended to operate a battery pack at a temperature of about −20° C. to about 50° C., but it is necessary to operate the battery pack even under the environment of −20° C. or less such as winter mountains.

However, in such an exemplary low temperature state, the battery pack has a problem in that the capacity of the usable battery pack is substantially reduced as the electrolyte increases in viscosity, and the movement of lithium ions moving during the charging/discharging is slowed to deteriorate lifetime, stability, and driving performance of the battery pack.

In order to solve the above-described problem in which an internal temperature of the battery pack decreases, according to the related art, a heat generating component has been simply attached to a Li-ion battery pack to increase the internal temperature of the battery pack, and then, the charging/discharging has been performed.

However, since the heat generating component is driven using the battery pack as a driving source, when the heat generating component is driven for the charging/discharging at an extremely low temperature, it may be used below a preset minimum discharge voltage of the battery pack by the reduced capacity of the battery due to the extremely low temperature.

As a result, permanent damage may occur at the battery pack, resulting in dangerous situations such as explosion and ignition.

In order to solve this problem, although a battery management system (BMS) within the battery pack is controlled to limit the use of the battery pack below the minimum discharge voltage, there is an additional problem in that the driving of the heat generating component is interrupted by the minimum discharge voltage when heat is not sufficiently transferred throughout the battery pack.

Thus, it is required to develop a technology for enabling a stale battery pack to be used because the capacity of the battery pack is not used below the minimum discharge voltage by driving the heat generating component before the charging/discharging.

PRIOR ART DOCUMENTS

Patent Documents (Patent Document 1) KR10-2016-0112073 A

DISCLOSURE OF THE INVENTION

Technical Problem

The present invention provides a method and apparatus for controlling a temperature of a battery pack, in which heat generation of a heat generating component driven under an extremely low temperature is controlled to safely and stably use the battery pack.

Technical Solution

A method for controlling a temperature of a battery pack according to an embodiment of the present invention includes: a battery pack temperature measurement step of measuring a temperature value of the battery pack before charging/discharging; an initial heat generating part driving step of controlling a turning-on/off of a heat generating unit switch through a pulse modulation (PWM) signal having a predetermined first duty ratio so that a heat generating unit is intermittently driven when the temperature value of the battery pack, which is measured in the battery pack temperature measurement step, is less than a preset second reference temperature value; a heat generating unit duration increasing step of outputting the PWM signal having the first duty ratio in the initial heat generating unit driving step as a PWM signal having a second duty ratio to turn on/off the heat generating unit switch when the temperature of the battery pack is equal to or greater than the preset second reference temperature value and less than a preset first reference temperature value after the heat generating unit is driven in the initial heat generating unit driving step; and a continuous heat generating unit driving step of setting the duty ratio of the PWM signal having the second duty ratio to 100% to continuously turn on the heat generating unit switch so that the heat generating unit is continuously driven when the temperature of the battery pack is equal to or greater than the preset first reference temperature value after the heat generating unit duration increasing step, wherein the second duty ratio is greater than the first duty ratio.

In the initial heat generating unit driving step, the first duty ratio may be set to decrease as the battery pack decreases in temperature.

The heat generating unit duration increasing step may include: a battery pack temperature re-measurement step of periodically measuring the temperature value of the battery pack heated by the heat generating unit of which a turn-on/off of the heat generating unit switch is controlled as the PWM signal having the first duty ratio after the initial heat generating unit driving step; a battery pack temperature comparison step of comparing the temperature value of the battery pack, which is measured in the battery pack temperature re-measurement step, with the preset second reference temperature value; and a correction PWM signal output step of increasing the first duty ratio of the PWM signal to the second duty ratio to output the PWM signal having the second duty ratio when the measured temperature of the battery pack is equal to or greater than the preset second reference temperature value according to the result of comparison in the battery pack temperature comparison step.

After the battery pack temperature measurement step, when the temperature of the battery pack, which is measured in the battery pack temperature measurement step, is equal to or greater than the preset second reference temperature value and less than the first reference temperature value, the second duty ratio of the PWM signal may be set to an initial driving duty ratio to turn on/off the heat generating unit switch.

After the battery pack temperature measurement step, when the temperature of the battery pack, which is measured in the battery pack temperature measurement step, is equal to or greater than the preset first reference temperature value, an initial driving duty ratio of the PWM signal may be set to 100% to continuously turn on the heat generating unit switch.

An apparatus for controlling a temperature of a battery pack constituted by a plurality of battery cells according to an embodiment of the present invention includes: a heat generating unit configured to surround the battery pack; a heat generating unit switch configured to turn on/off current supply to the heat generating unit; and a battery management system (BMS) configured to output a pulse modulation (PWM) signal which controls turn-on/off of the heat generating unit switch according to the temperature of the battery pack, wherein a duty ratio of the PWM signal is determined according to the temperature of the battery pack.

The BMS may include: a battery pack temperature measurement part configured to measure a temperature value of the battery pack; a temperature comparison part configured to compare the temperature value measured by the battery pack temperature measurement part with a plurality of preset reference temperature values; and a PWM signal output part configured to output each PWM signal having a predetermined duty ratio according to the result of comparison in the temperature comparison part.

The PWM signal output part may output a PWM signal having a predetermined first duty ratio when the temperature of the battery pack, which is measured by the battery pack temperature measurement part, is less than a preset second reference temperature value, output a correction PWM signal having a predetermined second duty ratio, which more increases than the first duty ratio, so that the heat generating unit increases in driving time when the temperature of the battery pack, which is measured by the battery pack temperature measurement part, is equal to or greater than the preset second reference temperature value and less than a first reference temperature value, and output a PWM signal having a third duty ratio at which the heat generating unit switch is continuously turned on so that the heat generating unit is continuously driven when the temperature of the battery pack, which is measured by the battery pack temperature measurement part, is equal to or greater than the preset first reference temperature value.

The PWM signal output part may set the first duty ratio to decrease as the battery pack decreases in temperature to output the PWM signal.

The BMS may further include a switch turn-on/off signal output part configured to output a turn-on/off switching control signal of the heat generating unit switch, and the switch turn-on/off signal output part may bypass the PWM signal output part to directly control the heat generating unit switch.

Advantageous Effects

In the method and apparatus for controlling the temperature of the battery pack according to the embodiment of the present invention, the PWM signal having the predetermined duty ratio under the extremely low temperature may be outputted to stably increase the duty ratio according to the increasing temperature, thereby stably increasing the temperature of the battery pack.

BRIEF DESCRIPTION OF THE DRAWINGS

FIG. 1 is a flowchart illustrating a method for controlling a temperature of a battery pack according to an embodiment of the present invention.

FIG. 2 is a flowchart illustrating a step of increasing duration of a heat generating unit in the method for controlling the temperature of the battery pack according to an embodiment of the present invention.

FIG. 3 is a PWM signal graph in the method for controlling the temperature of the battery pack according to an embodiment of the present invention.

FIG. 4 is a block diagram illustrating an apparatus for controlling a temperature of a battery pack according to an embodiment of the present invention.

MODE FOR CARRYING OUT THE INVENTION

Hereinafter, embodiments of the present invention will be described in detail with reference to the accompanying drawings. However, the present invention is not restricted or limited by the embodiments. Rather, the embodiments are provided so that the disclosure of the present invention is thorough and complete and fully conveys the scope of the present invention to those skilled in the art.

The term "first", "second" or the like may be used for describing various elements but does not limit the elements. Such terms are only used for distinguishing one element from other elements. For example, without departing the scope of the present invention, a first element may be referred to as a second element, and likewise, a second element may be referred to as a first element. The terminology used herein is not for delimiting the present invention but for describing specific embodiments. The terms of a singular form may include plural forms unless otherwise specified.

The terms used herein have been selected from among general terms that are widely used at the present time in consideration of the functions of the present invention, but may be changed depending on intentions of those skilled in the art, judicial precedents, or the advent of new technology. Furthermore, specific terms have been arbitrarily selected by the applicant, and the meanings of such terms will be described in detail in relevant sections of the description. Therefore, it should be understood that the terms used herein should not be simply defined literally but should be defined on the basis of the meanings of the terms and the overall contents of the present disclosure.

Embodiment 1

Next, a method for controlling a temperature of a battery pack according to an embodiment of the present invention will be described.

In the method for controlling the temperature of the battery according to the present invention, when the charging/discharging of the battery pack is performed at a low temperature, a PWM signal having a predetermined duty ratio may be outputted to drive a heat generating unit. Thus, the outputted duty ratio of the PWM signal increases as the battery pack increases in temperature so that a temperature value of the battery stably increases.

FIG. 1 is a flowchart illustrating a method for controlling a temperature of a battery pack according to an embodiment of the present invention.

Referring to FIG. 1, in a method for controlling a temperature of a battery pack according to an embodiment of the present invention, a temperature value of the battery pack is measured before charging/discharging is performed (a battery pack temperature measurement step: S110), and when the measured temperature of the battery pack is less than a preset second reference temperature, a heat generating unit switch is controlled to be turned on/off through a pulse modulation (PWM) signal having a predetermined first duty ratio so that the heat generating unit is intermittently driven (an initial heat generating unit driving step: S120).

After the heat generating unit is driven in the initial heat generating unit driving step (S120), when the temperature of the battery pack is equal to or greater than the second reference temperature value and less than a first reference temperature value, the PWM signal having the first duty ratio in the initial heat generating unit driving step (S120) is outputted as a PWM signal having a second duty ratio to turn on/off the heat generating unit switch (a heat generating unit duration increasing step: S130), and after the heat generating unit duration increasing step, when the temperature of the battery pack is equal to or greater than the preset first reference temperature value, the duty ratio of the PWM signal having the second duty ratio is set to 100%, and the heat generating unit switch is continuously turned on so that the heat generating unit is continuously driven (a continuous heat generating unit driving step: S140). Here, the second duty ratio is greater than the first duty ratio.

The present invention is an invention for increasing a temperature value of the battery pack to perform the charging/discharging under an extremely low temperature. In general, a proper driving temperature of the battery pack when charging is 0° C. to 45° C., a proper driving temperature of the battery pack when discharging is −20° C. to 60° C., and the battery pack has to be maintained at the proper driving temperature.

Thus, according to an embodiment, the preset second reference temperature value is set to −20° C. that is a reference value under the extremely low temperature.

Also, according to an embodiment, the preset first reference temperature value is set to −10° C. that is a temperature at which the capacity of the battery pack, which is reduced at the low temperature, is recovered by a predetermined range.

Also, each of the steps in the method for controlling the temperature of the battery pack will be described below in more detail.

The battery pack temperature measurement step (S110) is a step of measuring a temperature of the battery pack before the charging/discharging is performed. In this step, since the battery cell used in the battery pack is a lithium-based battery cell that is greatly affected by a temperature, a temperature value is measured to check whether the battery pack is capable of performing the charging/discharging before the charging/discharging is performed.

Generally, in the lithium-based battery cell, since internal resistance of the battery pack increases as the viscosity of the electrolyte increases under the extremely low temperature, and movement of lithium ions moving during the charging/discharging is slowed, usable capacity of the battery pack is reduced. Thus, when the charging or discharging is used below the preset minimum discharge voltage value, permanent damage may occur within the battery pack, and a risk of ignition and explosion may occur.

To improve this phenomenon, the battery pack is gradually heated, and this step is the initial heat generating unit driving step (S120).

When the temperature of the battery pack, which is measured in the battery pack temperature measurement step (S110), is less than the preset second reference temperature value, the initial heat generating unit driving step (S120) is a step of controlling the turn-on/off of the heat generating unit through the PWM signal having the predetermined first duty ratio so that the heat generating unit is intermittently driven. In this step, a voltage used in the heat generating unit is controlled so that the voltage of the battery pack is not reduced below the minimum discharge voltage according to the usable capacity of the battery pack, which is reduced under the extremely low temperature.

In the initial heat generating unit driving step (S120), the PWM signal having the predetermined first duty ratio is outputted as a control signal of the heat generating unit switch.

Here, the first duty ratio is determined by the minimum discharge voltage in a state in which the first duty ratio is less than the preset second reference temperature value.

Thus, according to an embodiment, the first duty ratio is set to be less than 30% so that the heat generating unit is driven by using minimum power of the battery pack.

In more detail, the first duty ratio is set to be lowered as the temperature of the battery pack decreases.

Since the dischargeable capacity of the battery pack decreases as the temperature of the battery pack decreases, the first duty ratio is separately set for each temperature section in the state in which the temperature of the battery pack is less than the preset second reference temperature value so that efficient control is performed.

For example, the first duty ratio is set to 30% for −42° C. to −40° C. and set to 25% for −44° C. to −42° C. That is, the first duty ratio may be adjusted to have different values.

Also, after the heat generating unit is driven in the initial heat generating unit driving step (S120), when the temperature of the battery pack is equal to or greater than the second reference temperature value and less than a first reference temperature value, the heat generating unit duration increasing step (S130) is a step of outputting the PWM signal having the first duty ratio in the initial heat generating unit driving step (S120) as the PWM signal having a second duty ratio to turn on/off the heat generating unit switch. This step will be described in more detail with reference to FIG. 2.

FIG. 2 is a flowchart illustrating a step of increasing the duration of the heat generating unit in the method for controlling the temperature of the battery pack according to an embodiment of the present invention.

Referring to FIG. 2, in the heat generating unit duration increasing step (S130), after the initial heat generating unit driving step (S120), a temperature value of the battery pack, which is heated by the heat generating unit that is controlled to be turned on/off through the PWM signal having the first duty ratio, is periodically measured (a battery pack temperature re-measurement step: S131), and the measured temperature value of the battery pack is compared with the preset second reference temperature (a battery pack temperature comparison step: S132).

When the measured temperature of the heat generating unit is equal to or greater than the preset second reference temperature value as the result of the comparison in the battery pack temperature comparison step (S132), the first duty ratio of the PWM signal increases to be outputted as a second duty ratio (a correction pulse modulation (PWM) signal output step: S133).

In more detail, the battery pack temperature re-measurement step (S131) is a step of periodically measure the temperature value of the battery pack, which is heated by the heat generating unit that is controlled to be turned on/off through the PWM signal having the first duty ratio after the initial heat generating unit driving step. In this step, the temperature value of the battery pack is continuously monitored.

Here, the battery pack temperature re-measurement step (S131) is repeatedly performed until the measured temperature of the battery pack is equal to or greater than the preset second reference temperature value.

Also, the battery pack temperature comparison step (S132) is a step of comparing the temperature value of the battery pack, which is measured in the battery pack temperature re-measurement step, with the preset second reference temperature value. This step is performed to check whether the temperature of the battery pack increases up to a temperature, at which predetermined capacity of the battery pack is secured, by the heat generating unit driven through the initial PWM signal having the predetermined initial duty ratio.

The correction PWM signal output step (S133) is a step of increasing the first duty ratio of the PWM signal to be outputted as the second duty ratio when the measured temperature of the battery pack is equal to or greater than the preset second reference temperature value as the result of the comparison in a first comparison step of the battery pack temperature. In this step, heat generated from the heat generating unit may increase for a quick battery pack operation.

Here, according to an embodiment, the increasing second duty ratio is set to a value within a range of 30% to 60%, but is not limited thereto.

Also, the continuous heat generating unit driving step (S140) is a step of continuously turning on the heat generating unit switch by setting the PWM signal having the second duty ratio to 100% so that the heat generating unit is continuously driven when the temperature of the battery pack is equal to or greater than the preset first reference temperature value after the heat generating unit duration increasing step (S130). In this step, since the capacity of the battery pack is recovered to a predetermined normal range, the battery pack may be safely and quickly heated from the complete discharge by the heat generating unit.

Also, the duty ratio of the PWM signal, which increases in the correction PWM signal output step and the continuous heat generating unit driving step (S140), may gradually increase.

Also, when the temperature of the battery pack, which is measured in the battery pack temperature measurement step (S110), is equal to or greater than the preset second reference temperature value and less than the second reference temperature value, the second duty ratio of the PWM signal is set to an initial driving duty ratio to turn on/off the heat generating unit switch, and after the battery pack temperature measurement step, when the temperature of the battery pack, which is measured in the battery pack temperature measurement step, is equal to or greater than the preset first reference temperature value, the initial driving duty ratio of the PWM signal is set to 100% to continuously turn on the heat generating unit switch.

The method for driving the heat generating unit will be described in more detail with reference to FIG. 3.

FIG. 3 is a PWM signal graph in the method for controlling the temperature of the battery pack according to an embodiment of the present invention.

Referring to FIG. 3, FIG. 3-(a) illustrates a graph of the PWM signal having the first duty ratio, which is outputted to the heat generating unit switch when the temperature of the battery pack, which is measured in the battery pack temperature measurement step (S110), is less than −20° C.

Thus, since the capacity is less than existing capacity of the battery pack due to the extremely low temperature, the heat generating unit is minimally driven to prevent the battery pack from being completely discharged.

According to an embodiment, the PWM signal is set to 30% so that the driving of the heat generating unit is performed only by 30%.

Also, FIG. 3-(b) illustrates a graph of the signal having the second duty ratio, which is outputted to the heat generating unit by more increasing than the duty ration of the PWM signal outputted in FIG. 3(a) when the temperature of the battery pack, which is measured in the battery pack temperature re-measurement step (S131), is −20° C. or more.

Thus, since the current capacity of the battery pack is greater than that of the battery pack under the extremely low temperature but less than the existing capacity of the battery pack, the heat generating unit is driven more frequently than the case of FIG. 3-(a) so that the internal temperature of the battery pack may increase.

According to an embodiment, the PWM signal is set to 55% so that the driving of the heat generating unit is performed only by 55%.

Also, FIG. 3-(c) illustrates a graph of a signal that is outputted by increasing in duty ratio of the PWM signal, which is outputted in FIG. 3-(b), or outputted as the turn-on signal by a heat generating unit turn-on/off signal output part that is separately provided when the temperature of the battery pack, which is periodically measured, is −10° C. or more.

Thus, since the current capacity of the battery pack is almost recovered to the capacity of the normal battery pack, the heat generating unit is continuously driven to stably use the battery pack.

As the PWM signal is 100%, the heat generating unit is normally driven.

Also, when the temperature of the battery pack, which is measured in the battery pack temperature measurement step (S110), is equal to or greater than −20° C. and less than −10° C., the PWM signal having the duty ratio of 55% in FIG. 3-(b) is outputted as an initial signal to reduce power consumption of the battery back rather than that for the driving of the existing heat generating unit.

Also, in addition to the configuration in the duty ratio control step, a duty ratio control step may be more finely classified according to the temperature to perform a more precise control.

Embodiment 2

Next, an apparatus for controlling a temperature of a battery pack according to an embodiment of the present invention will be described.

The apparatus for controlling the temperature of the battery pack of the present invention may control a heat generating unit switch to intermittently turn-on/off a heat generating unit attached to the battery pack under an extremely low temperature to stably safely perform charging/discharging of the battery pack.

FIG. 4 is a block diagram illustrating the apparatus for controlling the temperature of the battery pack according to an embodiment of the present invention.

Referring to FIG. 4, an apparatus 300 for controlling the temperature of the battery pack according to an embodiment of the present invention includes a heat generating unit 330 surrounding a battery pack 320 constituted by a plurality of battery cells, a heat generating unit switch 340 for turning on/off current supply to the heat generating unit 330, and a BMS 310 controlling the turn-on/off of the heat generating unit switch 340 to output a PWM signal.

Also, a duty ratio of the PWM signal is determined according to the temperature of the battery pack.

Also, the BMS 310 controlling the driving of the heat generating unit 330 will be described below in more detail.

The BMS 310 includes a battery pack temperature measurement part 311 measuring a temperature value of the battery pack 320, a temperature comparison part 312 comparing the temperature value that is measured by the battery pack temperature measurement part 311 with a plurality of preset reference temperature values, and a PWM signal output part 313 outputting each PWM signal having a predetermined duty ratio according to the result of the comparison of the temperature comparison part 312.

Hereinafter, the configuration of the BMS 310 will be described in more detail.

Also, the BMS 310 may further include a BMS temperature measurement part in which a temperature sensor is mounted to detect temperatures of elements within the BMS 310. This constituent may be replaced for the battery pack temperature measurement part 311 or be added to the existing constituent to improve accuracy of the battery pack temperature control.

The battery pack temperature measurement part 311 is a constituent for measuring the temperature value of the battery pack. More particularly, the battery pack temperature measurement part 311 is a constituent that performs a command to measure a temperature of each of the constituents.

In the battery pack 320, a temperature sensor is attached to a path through which current of the whole battery pack flows to detect a temperature value through the temperature sensor according to the command of the battery pack temperature measurement part 311 and transmit the detected temperature value to the battery pack temperature measurement part 311.

The temperature value transmitted to the battery pack temperature measurement part 311 is transmitted to the temperature comparison part 312 so as to be compared with the plurality of preset reference temperature values, thereby determining whether the PWM signal is outputted.

Also, in general, a proper driving temperature of the battery pack when charging is 0° C. to 45° C., and a proper driving temperature of the battery pack when discharging is −20° C. to 60° C. Thus, according to an embodiment, a preset second reference temperature value means −20° C. that is a reference value under an extremely low temperature.

Also, a first reference temperature value of the plurality of reference temperature values means −10° C. that is a temperature at which capacity of the battery pack, which is reduced under the low-temperature state, is recovered by a predetermined range.

Also, the PWM signal output part 313 is a constituent for outputting each PWM signal having a predetermined duty ratio according to the comparison result of the temperature comparison part. When the temperature of the battery pack, which is measured by the battery pack temperature measurement part 311, is less than the preset second reference temperature value, the PWM signal having the first duty ratio for turning on the heat generating unit switch 340 is outputted to present the battery pack 320 from being completely discharged.

In the case of the extremely low temperature state, since the capacity of the usable battery pack is extremely limited, the battery pack is not completely discharged due to the heat generating unit driven by using the voltage of the battery pack.

Also, the PWM signal output part 313 may output the PWM signal by setting the first duty ratio as a lower value as the temperature of the battery pack decreases.

This is done for a reason in which the battery pack quickly increases in temperature while preventing the battery pack from being completely discharged.

Also, when the temperature measured by the battery pack temperature measurement part 311 is equal to or greater than the preset second reference temperature value and less than the first reference temperature value, a driving time of the heat generating unit increases to output a correction PWM signal having a predetermined second duty ratio that more increases than the first duty ratio, and when the temperature of the battery pack, which is measured by the battery pack temperature measurement part, is equal to or greater than the preset first reference temperature value, a PWM signal having a third duty ratio for continuously driving the heat generating unit switch 340 is outputted so that the heat generating unit is continuously driven.

Here, according to an embodiment, since the first duty ratio is set to 30%, and the predetermined second duty ratio is set to 50%, the second duty ratio may increase rather than of the first duty ratio so that the heat generating unit 330 is more driven than that under the extremely low temperature.

Also, according to an embodiment, the third duty ratio is set to 100% so that the battery pack 110 is continuously driven until a turn-off signal is received into the heat generating unit 330.

Also, a separate switch turn-on/off output part for outputting a turn-on/off signal to control only the turn-on/off the heat generating unit 330 may be additionally provided.

Thus, since the turn-on/off signal output part has an algorithm simpler than that of the PWM signal output part 313, when the temperature of the battery pack is equal to or greater than the proper driving temperature, the heat generating unit switch may be directly controlled by bypassing the PWM signal output part.

The battery pack 320 is a constituent in which a plurality of battery cells are connected in series/parallel to each other. The battery cell used here is a lithium-based battery cell that is greatly affected by a temperature.

Generally, in the lithium-based battery cell, since internal resistance of the battery pack increases as viscosity of an electrolyte increases under the extremely low temperature, and movement of lithium ions moving during charging/discharging is slowed, usable capacity of the battery pack is reduced.

Thus, when the charging/discharging is continuously performed, permanent damage may occur within the battery pack, and a risk of ignition and explosion may occur by being lowered below the minimum discharge voltage due to the reduced capacity.

To solve this problem, the heat generating unit 330 uses a pad, a heating wire, a liquid heater, or a metal heater as a constituent that surrounds the battery pack 320 to maintain the battery pack at a proper temperature for facilitating the charging/discharging.

Also, the heat generating unit 330 may be attached to an upper portion, a lower portion, or upper and lower portions of the battery pack 320 or a side surface of the cell.

Also, the heat generating unit switch 340 is a constituent for turning on/off the current supply to the heat generating unit. Thus, the heat generating unit switch 340 controls the turn-on/off through a signal outputted from the PWM signal output part 313 or the turn-on/off signal output part.

Also, since the minimum discharge voltage value gradually increases below the second reference temperature value, the first duty ratio for each temperature section is separately set to realize efficient control.

For example, the first duty ratio is set to 30% for −42° C. to −40° C. and set to 25% for −44° C. to −42° C. That is, the first duty ratio may be adjusted to have different values.

A method for driving the apparatus 300 for controlling the temperature of the battery pack will be described below in more detail.

The apparatus 300 for controlling the temperature of the battery pack measures a temperature value of the battery pack through the battery pack temperature measurement part 311 before the charging/discharging and compares the temperature of the battery pack, which is measured by the temperature measurement part 311, through the temperature comparison part 312.

When the temperature value of the battery pack, which is compared through the temperature comparison part 312, is less than the preset second reference temperature value, a first duty ratio control signal is outputted to the heat generating unit switch 340, which supplies current to the heat generating unit 330, through the PWM signal output part 313.

Thereafter, the battery pack temperature measurement part 311 periodically measures the temperature value of the battery pack 320 and compares the measured temperature value through the temperature comparison part 312.

Here, when the re-measured temperature value of the battery pack 320 is equal to or greater than the preset second reference temperature value, the PWM signal output part 313 outputs a PWM signal having a second duty ratio that more increases than that of the first duty ratio control signal to the heat generating unit switch 340.

Also, the temperature value of the battery pack 320 is periodically measured through the battery pack temperature measurement part 311, and when the measured temperature value of the battery pack 320 is equal to or greater than the preset first reference temperature value, a PWM signal having the third duty ratio that has a duty ratio of 100% is outputted through the PWM signal output part 313, or the turn-on control signal is outputted through the turn-on/off signal output part that is additionally provided.

DESCRIPTION OF REFERENCE SYMBOLS

300: apparatus for controlling the temperature of the battery pack
310: BMS
311: battery pack temperature measurement part
312: temperature comparison part
313: PWM signal output part
320: Battery pack
330: heat generating unit
340: heat generating unit switch

The invention claimed is:

1. A method for controlling a temperature of a battery pack, the method comprising: a battery pack temperature measurement step of measuring a temperature value of the battery pack before charging/discharging; an initial heat generating part driving step of controlling a turning-on/off of a heat generating unit switch through a pulse modulation (PWM) signal having a predetermined first duty ratio so that the heat generating unit is intermittently driven when the temperature value of the battery pack, which is measured in the battery pack temperature measurement step, is less than a preset second reference temperature value; a heat generating unit duration increasing step of outputting the PWM signal having the first duty ratio in the initial heat generating unit driving step as a PWM signal having a second duty ratio to turn-on/off the heat generating unit switch when the temperature of the battery pack is equal to or greater than the preset second reference temperature value and less than a preset first reference temperature value after the heat generating unit is driven in the initial heat generating unit driving step; and a continuous heat generating unit driving step of setting the duty ratio of the PWM signal having the second duty ratio to 100% to continuously turn on the heat generating unit switch so that the heat generating unit is continuously driven when the temperature of the battery pack is equal to or greater than the preset first reference temperature value after the heat generating unit duration increasing step, wherein the second duty ratio is greater than the first duty ratio, and wherein the first duty ratio is set to 30% for −42° C. to −40° C. and 25% for −44° C. to −42°.

2. The method of claim 1, wherein in the initial heat generating unit driving step, the first duty ratio is set to decrease as the battery pack decreases in temperature.

3. The method of claim 1, wherein the heat generating unit duration increasing step comprises:
   a battery pack temperature re-measurement step of periodically measuring the temperature value of the battery pack heated by the heat generating unit of which a turn-on/off of the heat generating unit switch is controlled by the PWM signal having the first duty ratio after the initial heat generating unit driving step;
   a battery pack temperature comparison step of comparing the temperature value of the battery pack, which is measured in the battery pack temperature re-measurement step, with the preset second reference temperature value; and
   a correction PWM signal output step of increasing the first duty ratio of the PWM signal to the second duty ratio to output the PWM signal having the second duty ratio when the measured temperature of the battery pack is equal to or greater than the preset second reference temperature value according to a result of the comparison in the battery pack temperature comparison step.

4. The method of claim 1, wherein, after the battery pack temperature measurement step, when the temperature of the battery pack, which is measured in the battery pack temperature measurement step, is equal to or greater than the preset second reference temperature value and less than the preset first reference temperature value, the second duty ratio of the PWM signal is set to an initial driving duty ratio to turn on/off the heat generating unit switch.

5. The method of claim 1, wherein, after the battery pack temperature measurement step, when the temperature of the battery pack, which is measured in the battery pack temperature measurement step, is equal to or greater than the preset first reference temperature value, an initial driving duty ratio of the PWM signal is set to 100% to continuously turn on the heat generating unit switch.

6. An apparatus for controlling a temperature of a battery pack constituted by a plurality of battery cells, the apparatus comprising: a heat generating unit configured to surround the battery pack; a heat generating unit switch configured to turn on/off current supply to the heat generating unit; and a battery management system (BMS) configured to output a pulse modulation (PWM) signal which controls turning-on/off of the heat generating unit switch according to the temperature of the battery pack, wherein a duty ratio of the PWM signal is determined according to the temperature of the battery pack, wherein the duty ratio is set to 30% for −42° C. to −40° C. and 25% for −44° C. to −42° C.

7. The apparatus of claim 6, wherein the BMS comprises:
a battery pack temperature measurement pail configured to measure a temperature value of the battery pack;
a temperature comparison part configured to compare the temperature value measured by the battery pack temperature measurement part with a plurality of preset reference temperature values; and
a PWM signal output part configured to output each PWM signal having a predetermined duty ratio according to a result of the comparison in the temperature comparison part.

8. The apparatus of claim 7, wherein the PWM signal output part:
outputs a PWM signal having a predetermined first duty ratio when the temperature of the battery pack, which is measured by the battery pack temperature measurement part, is less than a preset second reference temperature value,
outputs a correction PWM signal having a predetermined second duty ratio, which more increases than the first duty ratio, so that the heat generating unit increases in driving time when the temperature of the battery pack, which is measured by the battery pack temperature measurement part, is equal to or greater than the preset second reference temperature value and less than a preset first reference temperature value, and
outputs a PWM signal having a third duty ratio at which the heat generating unit switch is continuously turned on so that the heat generating unit is continuously driven when the temperature of the battery pack, which is measured by the battery pack temperature measurement part, is equal to or greater than the preset first reference temperature value.

9. The apparatus of claim 8, wherein the PWM signal output part sets the first duty ratio to decrease as the battery pack decreases in temperature to output the PWM signal.

10. The apparatus of claim 6, wherein the BMS further comprises a switch turn-on/off signal output part configured to output a turn-on/off switching control signal of the heat generating unit switch, and
the switch turn-on/off signal output part bypasses the PWM signal output part to directly control the heat generating unit switch.

* * * * *